United States Patent
Park et al.

(10) Patent No.: US 11,038,169 B2
(45) Date of Patent: Jun. 15, 2021

(54) COBALT OXIDE FOR LITHIUM SECONDARY BATTERY, PREPARING METHOD THEREOF, LITHIUM COBALT OXIDE FOR LITHIUM SECONDARY BATTERY FORMED FROM THE COBALT OXIDE, AND LITHIUM SECONDARY BATTERY INCLUDING POSITIVE ELECTRODE COMPRISING THE LITHIUM COBALT OXIDE

(71) Applicant: SAMSUNG SDI CO., LTD., Yongin-si (KR)

(72) Inventors: Junseok Park, Yongin-si (KR); Seonyoung Kwon, Yongin-si (KR); Youngki Kim, Yongin-si (KR); Jihyun Kim, Yongin-si (KR); Dohyung Park, Yongin-si (KR); Sooyoun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 60 days.

(21) Appl. No.: 16/333,195

(22) PCT Filed: Sep. 5, 2017

(86) PCT No.: PCT/KR2017/009679
§ 371 (c)(1),
(2) Date: Mar. 13, 2019

(87) PCT Pub. No.: WO2018/052210
PCT Pub. Date: Mar. 22, 2018

(65) Prior Publication Data
US 2020/0203726 A1    Jun. 25, 2020

(30) Foreign Application Priority Data
Sep. 13, 2016 (KR) .................. 10-2016-0118209

(51) Int. Cl.
*H01M 4/525* (2010.01)
*C01G 51/00* (2006.01)
*H01M 10/0525* (2010.01)
*H01M 4/02* (2006.01)
*C01G 51/04* (2006.01)

(52) U.S. Cl.
CPC ............ *H01M 4/525* (2013.01); *C01G 51/04* (2013.01); *C01G 51/42* (2013.01);
(Continued)

(58) Field of Classification Search
None
See application file for complete search history.

(56) References Cited

U.S. PATENT DOCUMENTS 8,608,987 B2    12/2013    Chen et al.
2006/0263690 A1    11/2006    Suhara et al.
(Continued)

FOREIGN PATENT DOCUMENTS

CN    1738078 A    2/2006
CN    103746114 A    4/2014
(Continued)

OTHER PUBLICATIONS

Written Opinion of the International Searching Authority, corresponding to PCT/KR2017/009679, dated Dec. 7, 2017, 17 pages including English translation.
(Continued)

*Primary Examiner* — Ula C Ruddock
*Assistant Examiner* — Armindo Carvalho, Jr.
(74) *Attorney, Agent, or Firm* — Lewis Roca Rothgerber Christie LLP

(57) ABSTRACT

Provided are a cobalt oxide ($Co_3O_4$) for a lithium secondary battery, having an average particle diameter (D50) of about 14 μm to about 19 μm and a tap density of about 2.1 g/cc to about 2.9 g/cc, a method of preparing the cobalt oxide, a lithium cobalt oxide for a lithium secondary battery prepared from the cobalt oxide, and a lithium secondary battery including a cathode including the lithium cobalt oxide.

6 Claims, 9 Drawing Sheets

(52) U.S. Cl.
CPC ..... *H01M 10/0525* (2013.01); *C01P 2002/72* (2013.01); *C01P 2004/03* (2013.01); *C01P 2004/61* (2013.01); *C01P 2006/11* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 2010/0135897 A1 | 6/2010 | He |
| 2014/0124701 A1* | 5/2014 | Vanhatalo .............. C01G 51/04 252/182.1 |
| 2016/0002063 A1 | 1/2016 | Lim et al. |
| 2017/0062807 A1 | 3/2017 | Vanhatalo et al. |

FOREIGN PATENT DOCUMENTS

| | | |
|---|---|---|
| KR | 10-2010-0032369 A | 3/2010 |
| KR | 10-2014-0020821 A | 2/2014 |
| KR | 10-2015-0138141 A | 12/2015 |

OTHER PUBLICATIONS

International Search Report, corresponding to PCT/KR2017/009679, dated Dec. 7, 2017, 5 pages including English translation.

Liu, et al., "High-Temperature X-ray Diffraction Study of $Co_3O_4$: Transition from Normal to Disordered Spinel," Phys Chem Minerals (1990) 17: 168-172, 2 pages.

* cited by examiner

COBALT OXIDE FOR LITHIUM SECONDARY BATTERY, PREPARING METHOD THEREOF, LITHIUM COBALT OXIDE FOR LITHIUM SECONDARY BATTERY FORMED FROM THE COBALT OXIDE, AND LITHIUM SECONDARY BATTERY INCLUDING POSITIVE ELECTRODE COMPRISING THE LITHIUM COBALT OXIDE

CROSS-REFERENCE TO RELATED APPLICATION(S)

This application is a National Phase Patent Application and claims priority to and the benefit of International Application Number PCT/KR2017/009679, filed on Sep. 5, 2017, which claims priority to Korean Patent Application Number 10-2016-0118209, filed on Sep. 13, 2016, the entire contents of all of which are incorporated herein by reference.

TECHNICAL FIELD

The present disclosure relates to a cobalt oxide for a lithium secondary battery, a method of preparing the same, a lithium cobalt oxide formed from the cobalt oxide, and a lithium secondary battery having a cathode including the lithium cobalt oxide.

BACKGROUND ART

High-voltage lithium secondary batteries with high energy density are used in a variety of applications. For example, in the field of electric vehicles (including hybrid electric vehicles (HEVs) and plug-in hybrid electric vehicles (PHEVs)), a lithium secondary battery operable at a high temperature with good discharge capacity is required to charge and discharge a large quantity of electricity.

Lithium cobalt oxides have high energy density per volume, and thus are widely used as positive active materials. To further improve the capacity of lithium cobalt oxides, there is a need to increase the density of lithium cobalt oxides.

DESCRIPTION OF EMBODIMENTS

Technical Problem

Provided are a cobalt oxide for a lithium secondary battery having improved density, a method of preparing the cobalt oxide, and a lithium cobalt oxide for a lithium secondary battery prepared from the cobalt oxide.

Provided is a lithium secondary battery having improved capacity and high-rate characteristics by inclusion of a cathode including the above-described lithium cobalt oxide.

Solution to Problem

According to an aspect of the disclosure, there is provided a cobalt oxide ($Co_3O_4$) for a lithium secondary battery, the cobalt oxide having an average particle diameter (D50) of about 14 μm to about 19 μm and a tap density of about 2.1 g/cc to about 2.9 g/cc.

According to another aspect of the disclosure, there is provided a method of preparing a cobalt oxide for a lithium secondary battery, the method including: reacting a mixture including a cobalt precursor, a precipitant, and a solvent at a temperature of about 40° C. to about 60° C. to obtain a cobalt carbonate; and thermally treating the cobalt carbonate under an oxidizing gas atmosphere to obtain the cobalt oxide described above.

According to another aspect of the disclosure, there is provided a lithium cobalt oxide for a lithium secondary battery, the lithium cobalt oxide being a compound represented by Formula 1 and having a pellet density of about 4.0 g/cc to about 4.2 g/cc and an average particle diameter (D50) of about 23 μm to about 28 μm:

$$Li_aCo_bO_c \quad \text{[Formula 1]}$$

wherein, in Formula 1, $0.9 \le a \le 1.1$, $0.98 \le b \le 1.00$, and $1.9 \le c \le 2.1$ are satisfied.

According to another aspect of the disclosure, there is provided a lithium secondary battery including a cathode including the above-described lithium cobalt oxide.

Advantageous Effects of Disclosure

As described above, according to the one or more embodiments, a cobalt oxide may have a large average particle diameter, and thus may be used to prepare a lithium cobalt oxide having a large particle diameter without use of an excessive amount of a lithium precursor, unlike in the preparation of a lithium cobalt oxide using a cobalt oxide according to the related art. The lithium cobalt oxide obtained from the cobalt oxide according to one or more embodiments may have an increased pellet density, and accordingly an electrode with improved electrode density may be manufactured by using the lithium cobalt oxide according to one or more embodiments. By using the electrode, a lithium secondary battery with improved lifetime characteristics and high-rate characteristics may be manufactured.

MODE OF DISCLOSURE

Figure 1:
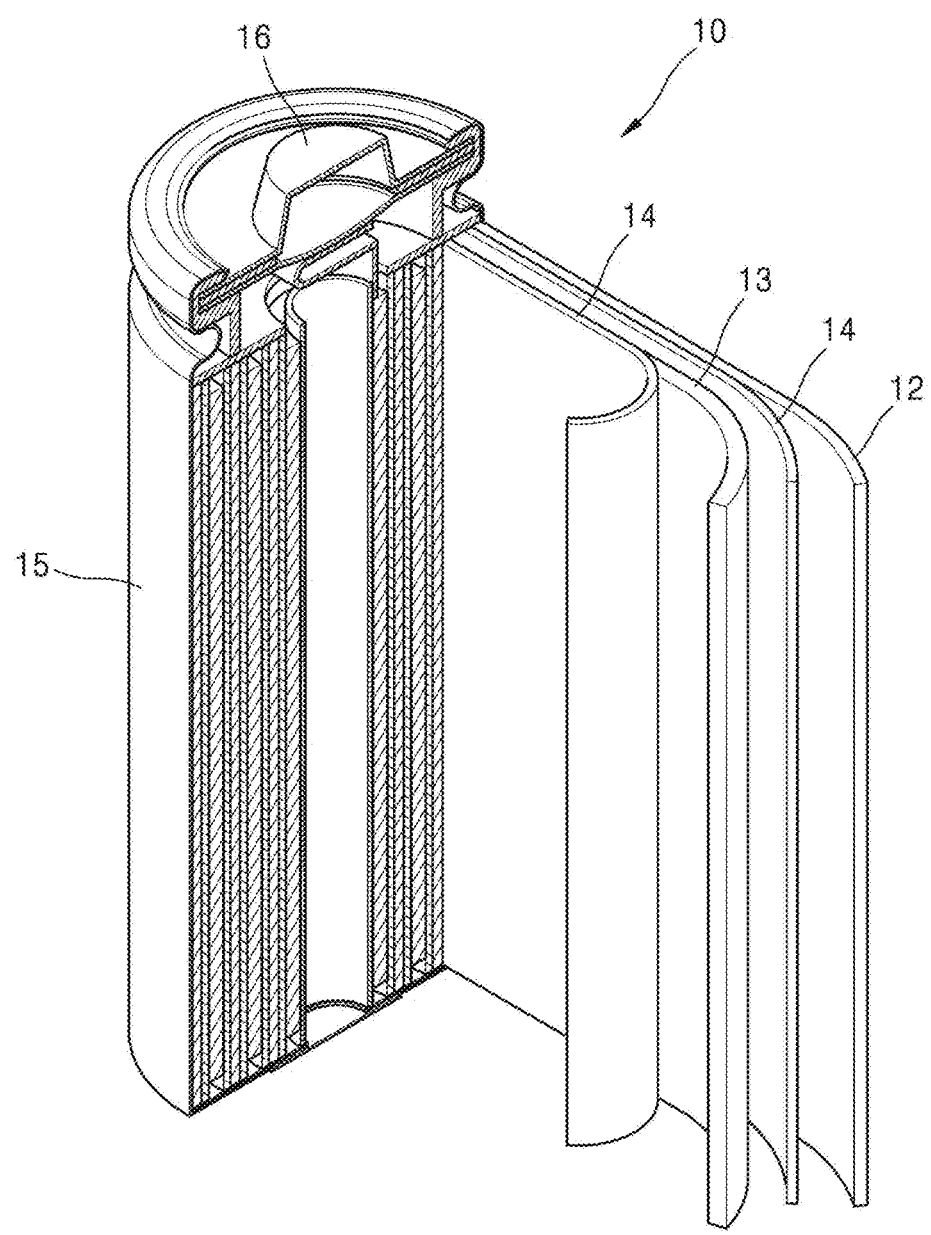
FIG. 1 is a schematic view of a lithium secondary battery according to an embodiment.

Hereinafter, embodiments of a cobalt oxide for a lithium secondary battery, a method of preparing the cobalt oxide, and a lithium secondary batter including a cathode including the cobalt oxide will be described in greater detail.

According to an aspect of the disclosure, there is provided a cobalt oxide ($Co_3O_4$) for a lithium secondary battery, the cobalt oxide having an average particle diameter of about 14 µm to about 19 µm and a tap density of about 2.1 g/cc to about 2.9 g/cc.

The cobalt oxide may have, for example, an average particle diameter of about 18 µm to about 19 µm. Using the cobalt oxide having such a large average particle diameter, a lithium cobalt oxide may be prepared without using an excessive amount of a lithium precursor. As a result, the prepared lithium cobalt oxide may have an improved pellet density, and thus be used to manufacture a cathode having an improved mixed density.

The cobalt oxide may exhibit a peak associated with an additional CoO phase at a diffraction angle 2θ of about 41° to about 44°. A content of the additional CoO phase may be in a range of about 0.5 mole % to about 2 mole % based on a total amount 100 mol % of the cobalt oxide. The content of the additional CoO phase may be obtained by, for example, Rietveld-based analysis of X-ray diffraction (XRD) patterns.

The Rietveld based analysis is used to obtain parameters of interest by fitting XRD patterns to a formulated equation. The Rietveld based analysis is an analysis method involving data fitting and calculation in consideration of factors such as lattice constant, crystallinity, and occupancy rate of elements.

When a cobalt oxide in small particles having an average particle diameter of 5 µm to about 7 µm is used as a precursor to prepare a lithium cobalt oxide having a large particle diameter size, it is usual to add an excessive amount of a lithium precursor such as lithium carbonate and lithium hydroxide. However, when an excessive amount of the lithium precursor is used as such, a secondary process for removing the excess lithium is necessary, increasing preparation costs.

To solve the above-described problems, the present inventors provide a method of preparing a cobalt oxide having a large average particle diameter without use of an excessive amount of a lithium precursor. As a result, a lithium cobalt oxide having a large particle diameter size using the method of preparing a cobalt oxide having a large average particle diameter is prepared.

When the cobalt oxide according to one or more embodiments has a tap density of about 2.1 g/cc to about 2.9 g/cc, a lithium cobalt oxide prepared from the cobalt oxide may have an increased pellet density of about 4.0 g/cc to about 4.2 g/cc. A cathode formed from the lithium cobalt oxide may have a high density of about 4.0 g/cc to about 4.2 g/cc, for example, about 4.0 g/cc to about 4.15 g/cc. By using the cathode having such an improved cathode density, a lithium secondary battery with improved lifetime characteristics and high-rate characteristics may be manufactured. When a lithium cobalt oxide having a pellet density below the above-identified range is excessively pressed to form a cathode having an increased density, the plate may be broken or impregnation of a liquid electrolyte may be poor, leading to deterioration in lifetime and electrochemical characteristics of a lithium secondary battery.

When a lithium cobalt oxide according to an embodiment is used to form a positive electrode, the cathode including the lithium cobalt oxide may be prevented from the above-described problems when pressed and may have improved electrochemical characteristics.

Hereinafter, a method of preparing a cobalt oxide for a lithium secondary battery according to one or more embodiment will be described.

A mixture of a cobalt precursor, a precipitant and a solvent may be subjected to a coprecipitation reaction at a temperature of about 40° C. to about 60° C. to obtain cobalt carbonate.

The precipitant may be at least one selected from ammonium bicarbonate ($NH_4HCO_3$), sodium carbonate ($Na_2CO_3$), and sodium bicarbonate ($NaHCO_3$). An amount of the precipitant may be adjusted to be in a range of about 2.5M to about 4.5M. When the amount of the precipitant is within this range, a cobalt oxide having a large particle size and being structurally stable may be obtained.

A pH of the mixture may be adjusted to be in a pH range of 7 to 8. When the pH of the mixture is within this range, a cobalt oxide in a desired particle state may be obtained.

The coprecipitation reaction time may vary depending on the reaction temperature, and may be in a range of about 80 hours to about 100 hours. The coprecipitation reaction may be performed while stirring at a rate of, for example, about 100 rpm to about 300 rpm.

For example, the cobalt precursor may be at least one selected from cobalt sulfate ($CoSO_4$), cobalt chloride ($CoCl_2$), and cobalt acetate. An amount of the cobalt precursor may be stoichiometrically adjusted to obtain a desired cobalt oxide. The cobalt precursor may be, for example, an about 1.0M to about 2.0M $CoSO_4$ solution.

The cobalt carbonate may be thermally treated under an oxidizing gas atmosphere to thereby prepare a cobalt oxide ($Co_3O_4$) having an increased average particle diameter. The cobalt oxide may also have improved density characteristics.

The oxidizing gas atmosphere may contain an oxidizing gas such as oxygen or air. For example, the oxidizing gas may consist of about 10 vol % to about 20 vol % of oxygen or the air and about 80 vol % to about 90 vol % of an inert gas.

The thermal treatment may be performed at a temperature of about 800° C. to about 1000° C. When the thermal treatment is performed in this high-temperature range under the oxidizing gas atmosphere, a cobalt oxide structurally stable and having a large particle diameter may be obtained.

During the thermal treatment a cobalt oxide (CoO) may be formed, as shown in Reaction Scheme 1. When the thermal treatment temperature of about 800° C. to about 1000° C. is cooled down to room temperature (25° C.), the cobalt oxide (CoO) may undergo a reaction as shown in Reaction Scheme 2. Due to this reaction, at a center of the cobalt oxide having a large particle diameter according to one or more embodiments, reaction of CoO in Reaction Scheme 2 may slow down, such that a CoO phase, which does not appear in a cobalt oxide obtained by a common preparation method, may remain in the cobalt oxide according to one or more embodiments.

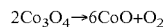  [Reaction Scheme 1]

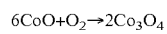  [Reaction Scheme 2]

The oxidizing gas atmosphere may include oxygen or the air. Under this condition, oxidation of a reaction product may be facilitated.

The solvent may be, for example, water. An amount of the solvent may be about 100 parts to about 5,000 parts by weight based on 100 parts by weight of the cobalt precursor. When the amount of the solvent is within this range, a uniform mixture of the ingredients may be obtained.

The cobalt oxide prepared according to the above-described processes may be repeated washed with deionized water until an amount of $SO_4$ becomes 1000 ppm or less.

The cobalt oxide according to one or more embodiments obtained through the above-described processes may have an improved tap density, as compared with a cobalt oxide prepared according to a common method of the related art. In one or more embodiments, the cobalt oxide may have a tap density of about 2 g/CC to about 3 g/CC, for example, about 2.1 g/CC to about 2.6 g/CC. By using such a cobalt oxide according to one or more embodiments, a high-density lithium cobalt oxide having a large particle diameter may be obtained. By using the lithium cobalt oxide, a cathode with improved density may be manufactured.

In one or more embodiments, the cobalt oxide may have an average particle diameter (D50) of about 14 μm to about 19 μm, for example, about 18 μm to about 19 μm, a particle diameter (D90) of about 23 μm to about 26 μm, and a particle diameter (D10) of about 13 μm to about 15 μm.

As used herein, the terms "D50", "D90", and "D10" may refer to particle diameters corresponds 50%, 90%, and 10% by volume, respectively, of a cumulative distribution curve of particles accumulated from smallest to largest in particle size (diameter) with respect to a 100% total volume of the accumulated particles.

Hereinafter, according one or more embodiments, a method of preparing a lithium cobalt oxide from the cobalt oxide according to one or more embodiments obtained through the above-described processes will be described.

The cobalt oxide may be mixed with a lithium precursor and then thermally treated at a temperature of about 1000° C. to about 1200° C.

The lithium precursor may be lithium hydroxide, lithium fluoride, lithium carbonate, or a mixture thereof. An amount of the lithium precursor may be stoichiometrically adjusted such as to obtain a lithium cobalt oxide represented by Formula 1. For example, the lithium precursor may be mixed with the cobalt oxide in a molar ratio of 1:1.

The thermal treatment may be performed under an oxidizing gas atmosphere. The oxidizing gas atmosphere may contain an oxidizing gas such as oxygen or the air. For example, the oxidizing gas may consist of about 10 vol % to about 20 vol % of oxygen or the air and about 80 vol % to about 90 vol % of an inert gas.

When the thermal treatment temperature is within the above range, the lithium cobalt oxide may have an increased pellet density.

A product from the thermal treatment may be grinded and then sieved to thereby obtain a lithium cobalt oxide having a desired average particle diameter and pellet density.

As described above, the lithium cobalt oxide according to one or more embodiments does not use an excessive amount of a lithium precursor, and thus the amount of residual lithium from the excessive lithium precursor is small. The amount of the residual lithium may be, for example, 500 ppm or less, as measured by titration.

In one or more embodiments, the lithium cobalt oxide may have an average particle diameter (D50) of about 23 μm to about 28 μm, a particle diameter (D90) of about 35 μm to about 45 μm, and a particle diameter (D10) of about 10 μm to about 12 μm.

According to another aspect of the disclosure, there is provided a lithium cobalt oxide for a lithium secondary battery, the lithium cobalt oxide being a compound represented by Formula 1 and having a pellet density of about 4.0 g/cc to about 4.2 g/cc and an average particle diameter (D50) of about 23 μm to about 28 μm.

$Li_aCo_bO_c$          [Formula 1]

In Formula 1, 0.9≤a≤1.1, 0.98≤b≤1.00, and 1.9≤c≤2.1.

In one or more embodiments, the lithium cobalt oxide may have a high pellet density, a spherical particle shape with improved sphericity, and thus reduced specific surface area. Using such a lithium cobalt oxide according to one or more embodiments, a cathode may have improved chemical stability even under high-temperature charge and discharge conditions. By using the lithium cobalt oxide according to one or more embodiments, a lithium secondary battery with improved capacity and high-rate characteristics may also be manufactured.

When a pellet density of the lithium cobalt oxide according to one or more embodiments is not within the above range, a lithium secondary battery using a cathode including the lithium cobalt oxide may have reduced high-rate and capacity characteristics.

For example, the lithium cobalt oxide represented by Formula 1 may be $LiCoO_2$.

In one or more embodiments, the lithium cobalt oxide may further include at least one element selected from magnesium (Mg), calcium (Ca), strontium (Sr), titanium (Ti), zirconium (Zr), boron (B), aluminum (Al), and fluorine (F). When a cathode is manufactured using the lithium cobalt oxide according to one or more embodiments further including at least one of these elements, a lithium secondary battery including the cathode may have further improved electrochemical characteristics.

Hereinafter, a method of manufacturing a lithium secondary battery using a lithium cobalt oxide according to any of the above-described embodiments as a positive active material will be described in detail. In particular, a method of manufacturing a lithium secondary battery including a positive electrode, a anode, a lithium salt-containing non-aqueous electrolyte, and a separator will be described as an embodiment.

The cathode and the anode may be formed by coating a positive active material layer composition and a negative active material layer composition on current collectors, respectively, and then drying the resulting products.

The positive active material layer composition may be prepared by mixing a positive active material, a conducting agent, a binder, and a solvent, wherein a lithium cobalt oxide according to any of the above-described embodiments may be used as the positive active material.

The binder may facilitate binding of an active material to a conducting agent and/or to a current collector. The amount of the positive active material may be in a range of about 1 part to about 50 parts by weight based on 100 parts by weight of the total weight of the positive active material. Non-limiting examples of the binder may include polyvinylidene fluoride, polyvinyl alcohol, carboxymethylcellulose (CMC), starch, hydroxypropylcellulose, reproduced cellulose, polyvinylpyrrolidone, tetrafluoroethylene, polyethylene, polypropylene, ethylene-propylene-diene terpolymer (EPDM), sulfonated EPDM, styrene-butadiene rubber, fluororubber, and various copolymers. The amount of the binder may be in a range of about 2 parts to about 5 parts by weight based on 100 parts by weight of a total weight of the positive active material. When the amount of the binder is within this range, a binding force of the positive active material layer to the current collector may be satisfactorily strong.

The conducting agent is not particularly limited, and may be any material as long as it has an appropriate conductivity without causing chemical changes in the fabricated battery. Non-limiting examples of the conducting agent may include graphite such as natural graphite or artificial graphite; carbonaceous materials such as carbon black, acetylene black, Ketjen black, channel black, furnace black, lamp black, or summer black; conductive fibers such as carbon fibers or metal fibers; metallic powder such as fluorinated carbon powder, aluminum powder, or nickel powder; conductive whiskers such as zinc oxide or potassium titanate; conductive metal oxides such as a titanium oxide; and a conductive material such as polyphenylene derivatives.

The amount of the conducting agent may be in a range of about 2 parts to about 5 parts by weight based on 100 parts by weight of a total weight of the positive active material. When the amount of the conducting agent is within this range above, a finally obtained cathode may have improved conductivity characteristics A non-limiting example of the solvent is N-methylpyrrolidone.

The amount of the solvent may be in a range of about 1 part to about 10 parts by weight based on 100 parts by weight of a total weight of the positive active material. When the amount of the solvent is within this range, the positive active material layer may be formed easily.

A positive current collector may have a thickness in a range of about 3 μm to about 500 μm, and is not particularly limited so long as a material forming the positive current collector has high conductivity without causing a chemical change in a battery. For example, the positive current collector may be formed of stainless steel, aluminum, nickel, titanium, heat-treated carbon, or aluminum or stainless steel that is surface-treated with carbon, nickel, titanium, silver, or the like. The positive current collector may have an uneven surface with fine irregularities to improve a binding force with the positive active material, and may have any of various forms, including a film, a sheet, a foil, a net, a porous body, a foam, and a non-woven fabric.

The negative active material layer composition may be prepared by mixing a negative active material, a binder, a conducting agent, and a solvent together.

The negative active material may be a material that allows intercalation and deintercalation of lithium ions. Non-limiting examples of the negative active material may include a carbonaceous material such as graphite and carbon; lithium metal and an alloy thereof; and a silicon oxide-based material. In some embodiments, the negative active material may be silicon oxide.

The amount of the binder may be in a range of about 1 part to about 50 parts by weight based on 100 parts by weight of a total weight of the negative active material. Non-limiting examples of the binder are the same as those listed above in connection with the preparation of the positive electrode.

The amount of the conducting agent may be in a range of about 1 part to about 5 parts by weight based on 100 parts by weight of a total weight of the negative active material. When the amount of the conducting agent is within this above, a finally obtained anode may have improved conductivity characteristics.

The amount of the solvent may be in a range of about 1 part to about 10 parts by weight based on 100 parts by weight of a total weight of the negative active material. When the amount of the solvent is within this range, forming the negative active material layer may be facilitated.

Non-limiting examples of the conducting agent and the solvent used herein may be the same as those listed above in connection with the preparation of the positive electrode.

A negative current collector may have a thickness in a range of about 3 μm to about 500 μm, and is not particularly limited so long as a material forming the negative current collector has conductivity without causing a chemical change in a battery. For example, the negative current collector may be formed of copper, stainless steel, aluminum, nickel, titanium, heat-treated carbon, or copper or stainless steel that is surface-treated with carbon, nickel, titanium, silver, or the like. In addition, similar to the positive current collector, the negative current collector may have an uneven surface with fine irregularities to improve a binding force with the negative active material, and may have any of various forms, including a film, a sheet, a foil, a net, a porous body, a foam, and a non-woven fabric.

Then, a separator may be disposed between the cathode and the anode fabricated according to the above-described processes.

The separator may have a pore diameter in a range of about 0.01 μm to about 10 μm and a thickness in a range of about 5 μm to about 300 μm Examples of the separator are an olefin-based polymers such polypropylene or polyethylene; or sheets or non-woven fabric formed of glass fiber. When a solid electrolyte, for example, a polymer electrolyte is used, the solid electrolyte may also serve as the separator.

The lithium salt-containing non-aqueous electrolyte may include a non-aqueous electrolyte and a lithium salt. The non-aqueous electrolyte may be a non-aqueous liquid electrolyte, an organic solid electrolyte, or an inorganic solid electrolyte.

The non-aqueous liquid electrolyte may be an aprotic organic solvent, for example, N-methyl-2-pyrrolidone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethylsulfoxide, 1,3-dioxolane, N,N-formamide, N,N-dimethylformamide, dioxolane, acetonitrile, nitromethane, methyl formate, methyl acetate, phosphoric acid triester, trimethoxy methane, a dioxolane derivative, sulfolane, methylsulfolane, 1,3-dimethyl-2-imidazolidinone, a propylene carbonate derivative, a tetrahydrofuran derivative, ether, methyl propionate, and ethyl propionate. However, embodiments are not limited thereto.

Non-limiting examples of the organic solid electrolyte may include a polyethylene derivative, a polyethylene oxide derivative, a polypropylene oxide derivative, a phosphoric acid ester polymer, polyester sulfide, polyvinyl alcohol, and polyfluoride vinylidene.

Non-limiting examples of the inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt as a material dissoluble in a non-aqueous electrolyte may be, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, lithium chloroborate, lower aliphalic lithium carboxylate, and lithium tetraphenyl borate. However, embodiments are not limited thereto.

FIG. 1 is a schematic cross-sectional view illustrating a structure of a lithium secondary battery 10 according to an embodiment.

Referring to FIG. 1, the lithium secondary battery 10 according to an embodiment may include a cathode 13; a anode 12; a separator 14 between the cathode 13 and the anode 12; an electrolyte (not shown) impregnated into the cathode 13, the anode 12, and the separator 14; a battery case 15; and a cap assembly 16 sealing the battery case 15. The lithium secondary battery 10 may be manufactured by sequentially stacking the cathode 13, the separator 14, and the anode 12 in this stated order to form a stack, winding this stack into a spiral form, and encasing the wound stack in the battery case 15. The battery case 15 may then be sealed with the cap assembly 16, thereby completing manufacturing of the lithium secondary battery 10.

One or more embodiments of the disclosure will now be described in detail with reference to the following examples and comparative examples. However, these examples are only for illustrative purposes and are not intended to limit the scope of the one or more embodiments of the disclosure.

Example 1: Preparation of Cobalt Oxide and Lithium Cobalt Oxide

An about 1.0M-cobalt chloride ($CoCl_2$) aqueous solution, and an about 1.7M-ammonium bicarbonate ($NH_4HCO_3$) aqueous solution as a precipitant were subjected to a coprecipitation reaction in a batch manner at about 50° C. and a pH of 7 to 8. At an initial stage of the coprecipitation reaction, about 10% of a total volume of a reactor was filled with the $NH_4HCO_3$ solution, and then the cobalt chloride solution and the $NH_4HCO_3$ solution were simultaneously put thereinto. When the reactor was filled to about 80% of the volume thereof, a reaction product ($CoCO_3$) was stirred for about 10 minutes to obtain a precipitate. After the precipitate was obtained, the remaining supernatant was removed from the precipitate and then $NH_4HCO_3$ solution was added again until the pH reached about 7.8 to 8.0. Then, the cobalt chloride solution and the $NH_4HCO_3$ solution were put into the reactor, and the unprecipitated supernatant was removed. These coprecipitation reaction processes were repeatedly performed until an average particle diameter (D50) of the precipitate became about 22 μm. The resulting coprecipitation reaction product was centrifuged to remove the supernatant, and the remaining product was washed with about 70° C.-deionized water to thereby obtain cobalt carbonate ($CoCO_3$).

The cobalt carbonate was thermally treated at about 800° C. under air atmosphere to obtain cobalt oxide ($Co_3O_4$) ($1^{st}$ thermal treatment).

A cobalt oxide having an average particle diameter of about 18.5 μm was used. The cobalt oxide was repeatedly washed with deionized water until a content of $SO_4$ reached about 1000 ppm or less. The obtained cobalt oxide and lithium carbonate were dry-mixed with a mixer for about 5 minutes so that the atomic ratio of lithium to cobalt was about 1:1, and then thermally treated at about 1100° C. under an oxygen-including atmosphere for about 10 hours ($2^{nd}$ thermal treatment). After the $2^{nd}$ thermal treatment, the resulting product was pulverized by jet milling at about 2000 rpm and then sieved to thereby obtain a lithium cobalt oxide ($LiCoO_2$).

Example 2: Preparation of Cobalt Oxide and Lithium Cobalt Oxide

A cobalt oxide ($Co_3O_4$) having an additional cobalt oxide (CoO) phase, and a lithium cobalt oxide ($LiCoO_2$) were obtained in the same manner as in Example 1, except that the $1^{st}$ thermal treatment temperature was changed to about 900° C. in preparing the cobalt oxide.

Comparative Example 1: Preparation of Cobalt Oxide and Lithium Cobalt Oxide

A 2.0M-cobalt sulfate ($CoSO_4$) solution as a starting material, a 3.0M-sodium hydroxide (NaOH) aqueous solution as a precipitant, and ammonium hydroxide ($NH_4OH$) as a chelating agent were subjected to a precipitation reaction in a continuous manner.

The precipitation reaction was performed at a temperature of about 65° C. and a pH of about 10. The reaction product obtained through the continuous precipitation reaction was filtered using a filter press or a centrifuge, and the obtained precipitate was washed with deionized water. The washed precipitate was dried at a temperature of about 100° C. to about 150° C. for about 12 hours to obtain a CoOOH precursor. This precursor was thermally treated at about 750° C. under air atmosphere to obtain a cobalt oxide precursor (CoOOH) having an average particle diameter (D50) of about 5 um.

The cobalt oxide precursor (CoOOH) was thermally treated at a temperature of about 900° C. to obtain a cobalt oxide ($Co_3O_4$) ($1^{st}$ thermal treatment).

The obtained cobalt oxide and lithium carbonate were dry-mixed in a mixer for about 5 minutes so that the atomic ratio of lithium to cobalt was about 1.05:1, and then thermally treated at about 1100° C. under oxygen-including atmosphere for about 10 hours ($2^{nd}$ thermal treatment). After the $2^{nd}$ thermal treatment, the resulting product was pulverized by jet milling at about 2,000 rpm. Subsequently, post-treatment on the residual lithium was carried out, followed by sieving to thereby obtain a lithium cobalt oxide ($LiCoO_2$).

The post-treatment on the residual lithium is the process of removing the residual lithium of a lithium cobalt oxide ($LiCoO_2$). The post-treatment on the residual lithium was performed by calcination a mixture at about 950° C., the mixture obtained by mixing the reaction product of the $2^{nd}$ thermal treatment with Me-based powder to induce reaction of the residual lithium of the lithium cobalt oxide ($LiCoO_2$) and the Me-based powder. Here, the Me-based powder was $Co(OH)_2$.

Manufacture Example 1

A coin cell was manufactured as follows with the lithium cobalt oxide prepared in Example 1 as a positive active material.

96 g of the lithium cobalt oxide obtained in Example 1, 2 g of polyvinylidene fluoride, 47 g of N-methylpyrrolidone as a solvent, and 2 g of carbon black as a conducting agent were mixed together with a mixer and then degassed to prepare a uniformly dispersed slurry for forming a positive active material layer.

The prepared slurry was coated on an aluminum foil using a doctor blade to form a thin electrode plate. The electrode plate was dried at about 135° C. for about 3 hours, roll-pressed, and then vacuum-dried to thereby manufacture a positive electrode.

A 2032-type coin cell was manufactured using the cathode and a lithium metal counter electrode. A porous polyethylene (PE) film separator (having a thickness of about 16 μm) was disposed between the cathode and the lithium metal counter electrode, and then an electrolyte was injected thereinto to thereby obtain the 2032-type coin cell.

The electrolyte was a solution of 1.1M $LiPF_6$ dissolved in a mixed solvent of ethylene carbonate (EC) and ethyl methyl carbonate (EMC) in a volume ratio of about 3:5.

Manufacture Example 2

A coin cell was manufactured in the same manner as in Manufacture Example 1, except that the lithium cobalt oxide prepared in Example 2 was used instead of the lithium cobalt oxide prepared in Example 1.

Comparative Manufacture Example 1

A coin cell was manufactured in the same manner as in Manufacture Example 1, except that the lithium cobalt oxide prepared in Comparative Example 1 was used instead of the lithium cobalt oxide prepared in Example 1.

Evaluation Example 1: X-Ray Diffraction (XRD) Analysis

The cobalt oxides ($Co_3O_4$) prepared in Examples 1 and 2 and Comparative Example 1 were analyzed by X-ray diffraction analysis. The analysis results are shown in FIG. 2.

Figure 2:
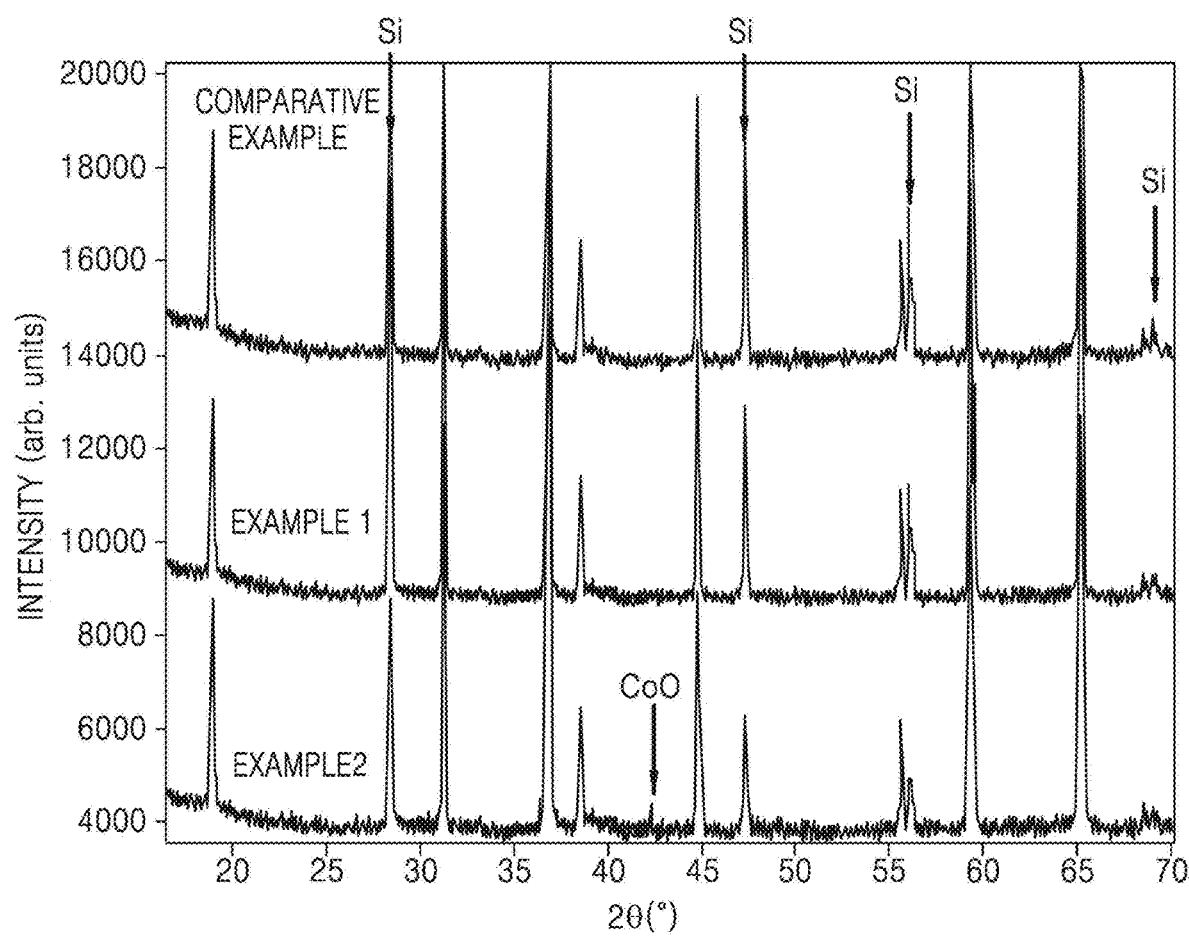
FIG. 2 illustrates results of X-ray diffraction analysis of cobalt oxides ($Co_3O_4$) prepared in Example 1 and Comparative Example 1.

Referring to FIG. 2, the cobalt oxide prepared in Example 2 was found to form a CoO phase, which was detected at a diffraction angle (2θ) of about 43,° unlike the cobalt oxides prepared in Example 1 and Comparative Example 1. The cobalt oxide prepared in Example 2 was found to have a CoO content of about 1.5 mole %, as a result of Rietveld-based analysis of XRD patterns.

Evaluation Example 2: Tap Density

Tap densities of the cobalt oxides prepared in Examples 1 and 2 and Comparative Example 1 were measured. The results are shown in Table 1.

TABLE 1

| Example | Tap density (g/cc) |
|---|---|
| Cobalt oxide of Example 1 | 2.1 |
| Cobalt oxide of Example 2 | 2.6 |
| Cobalt oxide of Comparative Example 1 | 1.7 |

Referring to Table 1, the cobalt oxides prepared in Examples 1 and 2 were each found to have a higher tap density, as compared with that of the cobalt oxide prepared in Comparative Example 1. Accordingly, using the cobalt oxides prepared in Examples 1 and 2, a lithium cobalt oxide with improved electrochemical characteristics may be prepared, as compared with when using the cobalt oxide of Comparative Example 1.

The high tap density of the cobalt oxide of Example 2 is attributed to the 1$^{st}$ thermal treatment conditions, i.e., the higher 1$^{st}$ thermal treatment temperature as compared with that in Example 1, leading to generation of CoO and reduced porosity of particles.

Evaluation Example 3: Scanning Electron Microscopy (SEM) and Particle Size Distribution Analysis 1) Cobalt Oxides of Examples 1 and 2 and Comparative Example 1

Figure 3:
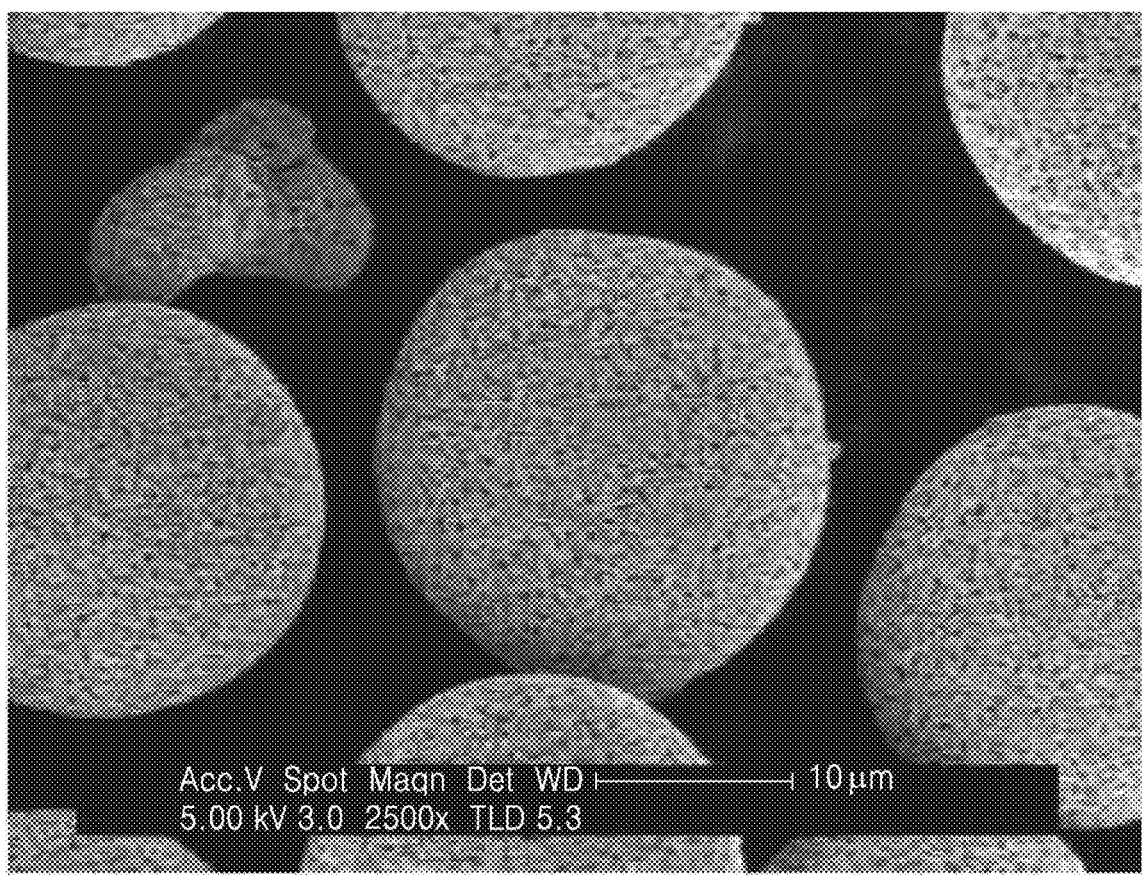
FIG. 3 is a scanning electron microscope (SEM) image of the cobalt oxide prepared in Example 1.
Figure 4A:
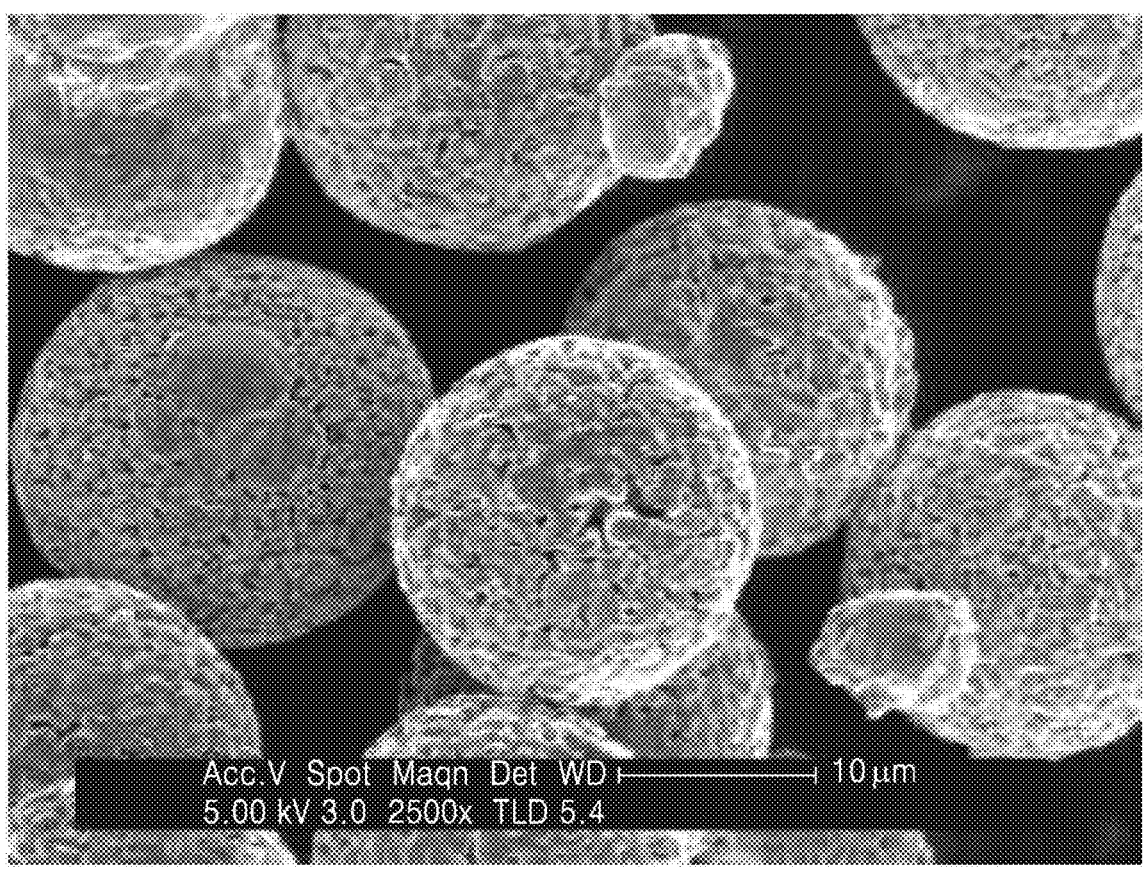
FIGS. 4A and 4B are a SEM image and a 5,000× magnification SEM image, respectively, of cobalt oxide prepared in Example 2.
Figure 4B:
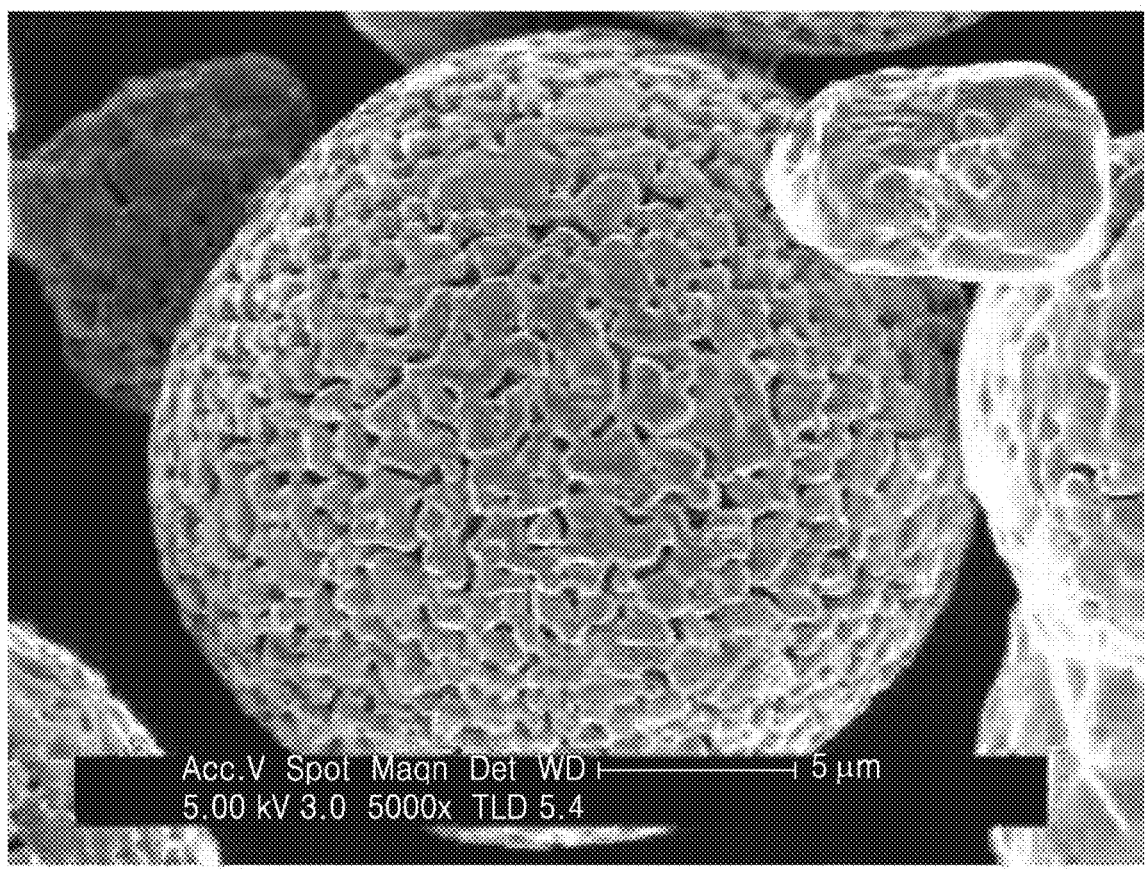
Figure 5A:
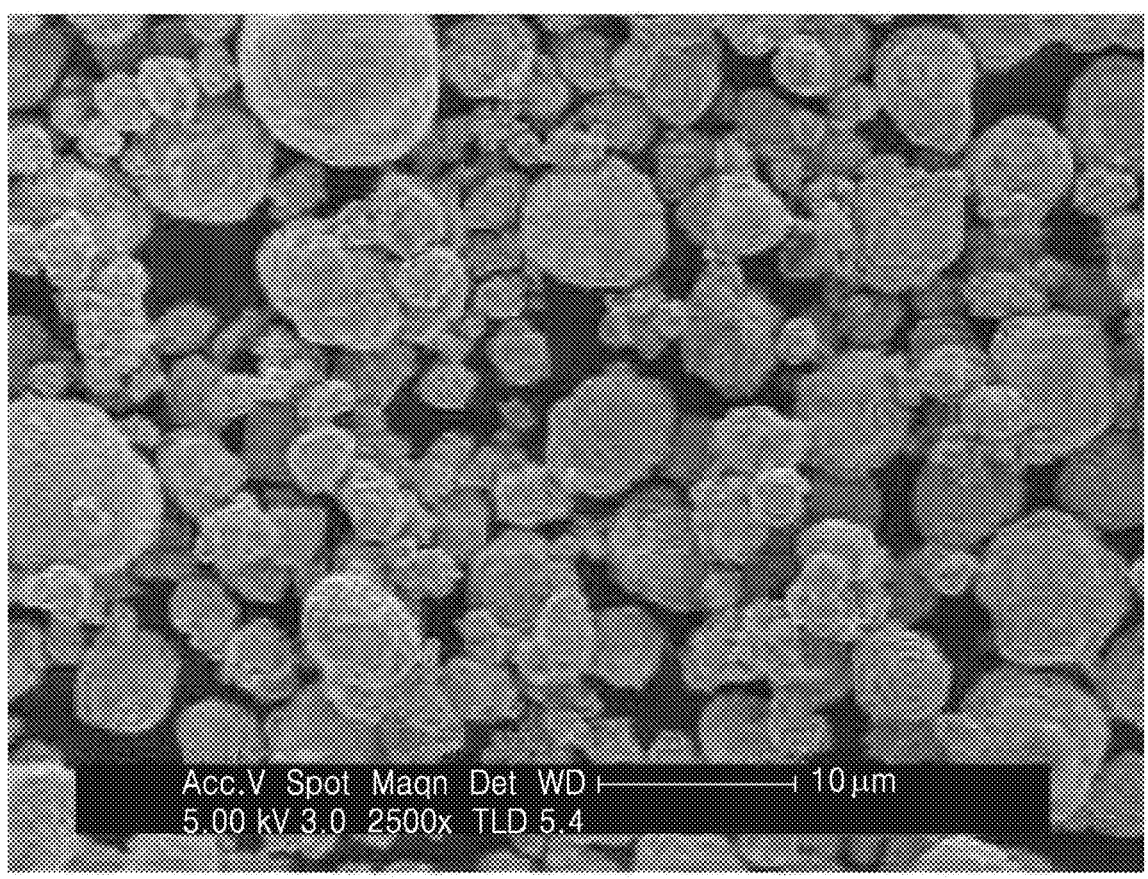
FIGS. 5A and 5B are a SEM image and a 2,500× magnification SEM image, respectively, of the cobalt oxide prepared in Comparative Example 1.
Figure 5B:
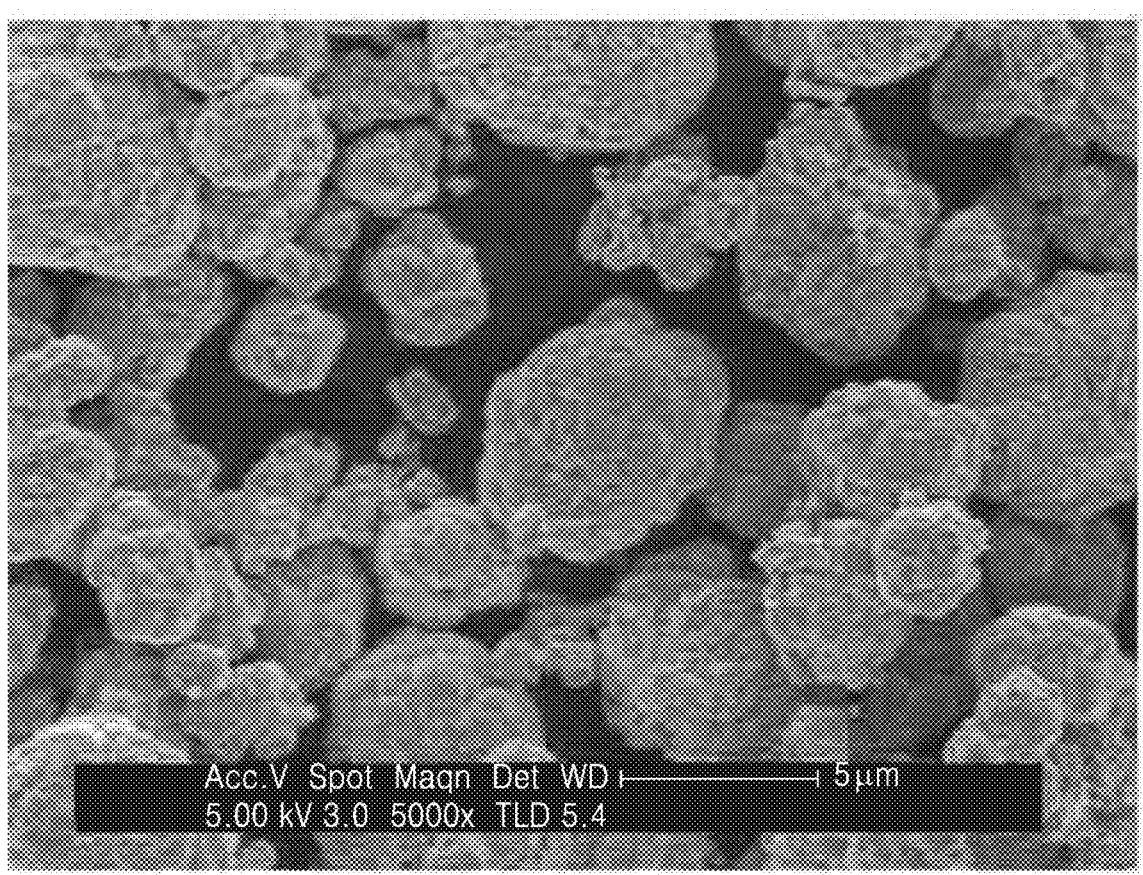

The cobalt oxides prepared in Examples 1 and 2 and Comparative Example 1 were analyzed by scanning electron microscopy (SEM). FIGS. 3, 4A, and 5A are SEM images of the cobalt oxides prepared in Example 1, Example 2, and Comparative Example 1, respectively. FIGS. 4B and 5B are SEM images of the cobalt oxides of Example 2 and Comparative Example 1, respectively.

Referring to the SEM images, the cobalt oxides ($Co_3O_4$) prepared in Examples 1 and 2 were found to have spherical shapes.

Particle size distributions of the cobalt oxides prepared in Examples 1, 2, and Comparative Example 1 were analyzed. The results are shown in Table 2. The particle size distribution analysis was performed using dynamic light scattering. To evaluate the particle size distribution, D10, D90, and D50 were calculated on a volume basis of particles by dry laser diffraction particle size analysis.

TABLE 2

| Example | D10 (μm) | D50 (μm) | D90 (μm) |
|---|---|---|---|
| Example 1 | 14.82 | 18.55 | 24.48 |
| Example 2 | 14.71 | 18.14 | 25.90 |
| Comparative Example 1 | 2.6 | 5.4 | 8.8 |

Referring to Table 2, the cobalt oxides prepared in Examples 1 and 2 were found to have larger particle diameters (D50, D10 and D90), as compared with those of the cobalt oxide of Comparative Example 1. Due to having such increased particle diameters, the cobalt oxides of Examples 1 and 2 may form a lithium cobalt oxide having a large particle diameter and a high density, without addition of an excessive amount of a lithium precursor as in a preparation method according to the related art.

Particle size distributions of the lithium cobalt oxides (LCO) obtained in Examples 1 and 2 and Comparative Example 1 were analyzed. The results are shown in Table 3.

TABLE 3

| Example | D10 (μm) | D50 (μm) | D90 (μm) |
|---|---|---|---|
| Example 1 | 12.1 | 23 | 37.6 |
| Example 2 | 11.1 | 26.1 | 41.6 |
| Comparative Example 1 | 5 | 15.5 | 29 |

Referring to Table 3, the lithium cobalt oxides prepared in Examples 1 and 2 were found to have particle size distribution characteristics suitable for use in manufacturing a high-density positive electrode.

It was also found that D50 of a lithium cobalt oxide (LCO) varies depending on the size of the cobalt oxide ($Co_3O_4$) used as a precursor of the lithium cobalt oxide. Although different thermal treatment temperatures were applied in the preparation of the cobalt oxides (precursors) of Examples 1 and 2, the difference in temperature was found not to have a significant effect on the particle size of the lithium cobalt oxide (LCO).

Evaluation Example 4: Pellet Density and Cathode Density

Pellet densities of the lithium cobalt oxides (LCO) prepared in Examples 1 and 2 and Comparative Example 1, and cathode densities of coin cells manufactured in Manufacture Examples 1 and 2 and Comparative Manufacture Example 1 were evaluated. The results are shown in Table 4 and FIG. 7.

The cathode densities were evaluated based on whether a cathode was broken or not when arranged between a pair of presses and pressed to be bent by 180°.

Figure 7:
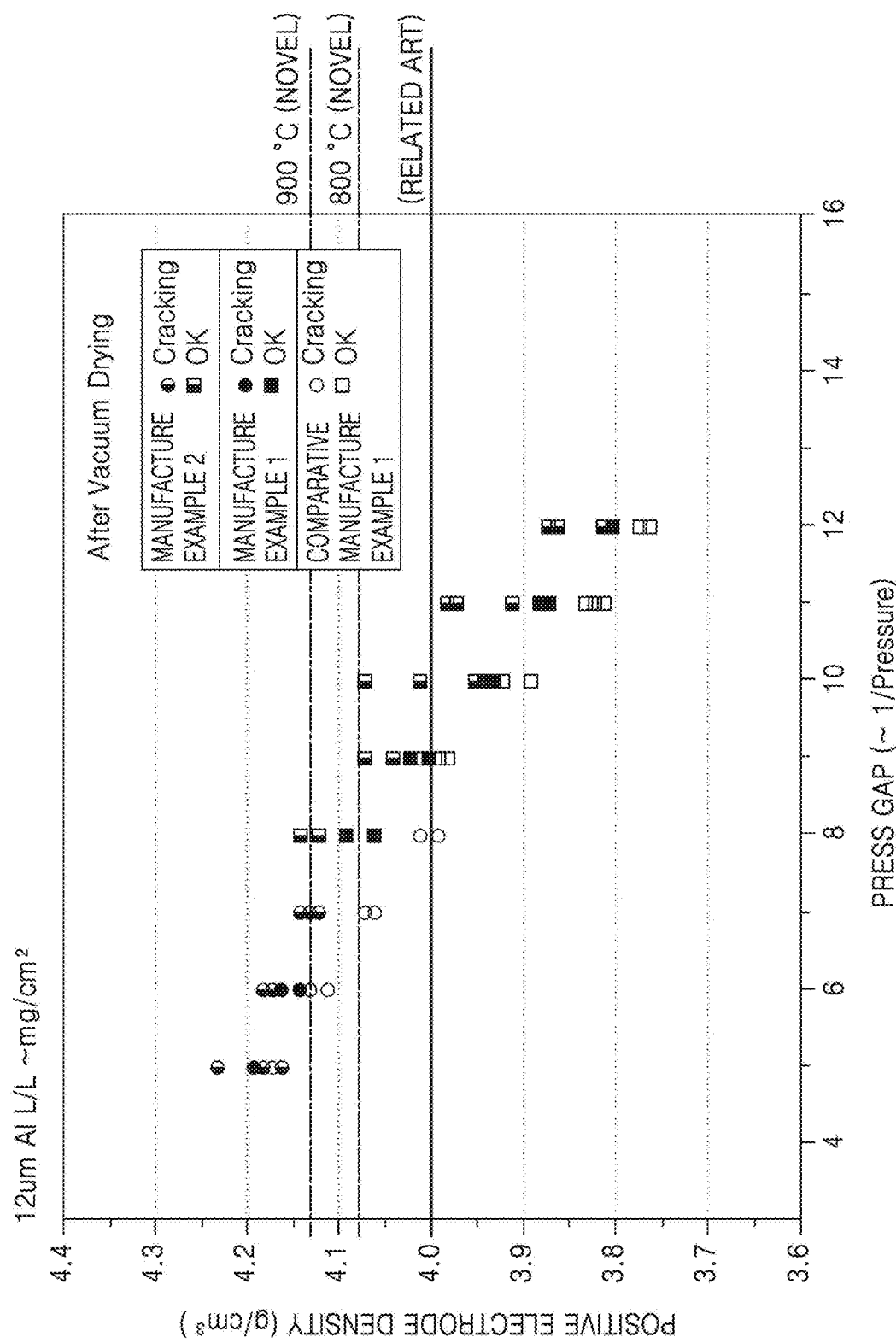
FIG. 7 is a graph illustrating positive densities of the lithium secondary batteries manufactured in Manufacture Examples 1 and 2 and Comparative Manufacture Example 1.

In FIG. 7, "Cracking" indicates that the cathode was broken, and "OK" indicates that the cathode remained intact.

TABLE 4

| Example | Pellet density of LCO (g/cc) | Cathode density (g/cc) |
|---|---|---|
| Example 1 & Manufacture Example 1 | 4.01 | 4.06 |
| Example 2 & Manufacture Example 2 | 4.10 | 4.13 |
| Comparative Example 1 & Comparative Manufacture Example 1 | 3.87 | 4.00 |

Referring to Table 4, the lithium cobalt oxides (LCO) prepared in Examples 1 and 2 were each found to have an improved pellet density, as compared with that of the LCO of Comparative Example 1. The lithium cobalt oxide (LCO) of Example 2 was found to have a further improved pellet density, as compares with that of the LCO of Example 1.

Referring to Table 4 and FIG. 7, the positive electrodes formed in Manufacture Examples 1 and 2 were each found to have an improved density, as compared with that of Comparative Manufacture Example 1. The cathode formed in Manufacture Example 2 was also found to have a higher density, as compared with that of Manufacture Example 1.

Evaluation Example 5: Charge-Discharge Test
(Initial Charge Efficiency and Capacity Retention Charge and discharge characteristics of the lithium secondary batteries manufactured in Manufacture Examples 1 and 2 and Comparative Manufacture Example 1 were evaluated under the following conditions.

Each of the lithium secondary batteries of Manufacture Example 1 and Comparative Manufacture Example 1 was charged and discharged once at a current rate of 0.1 C (formation process). After one cycle of charging and discharging at a current rate of 0.2 C, initial charge/discharge characteristics of each of the lithium secondary batteries were determined. Cycle characteristics of the lithium secondary batteries were evaluated while the charge and discharge cycle was repeated 50 times.

The charging was set to begin in a constant current (CC) mode and then shift to a constant voltage (CV) mode with a cutoff current of 1 C. The discharging was set to a CC mode with a cutoff voltage of 4.55 V.

Figure 6:
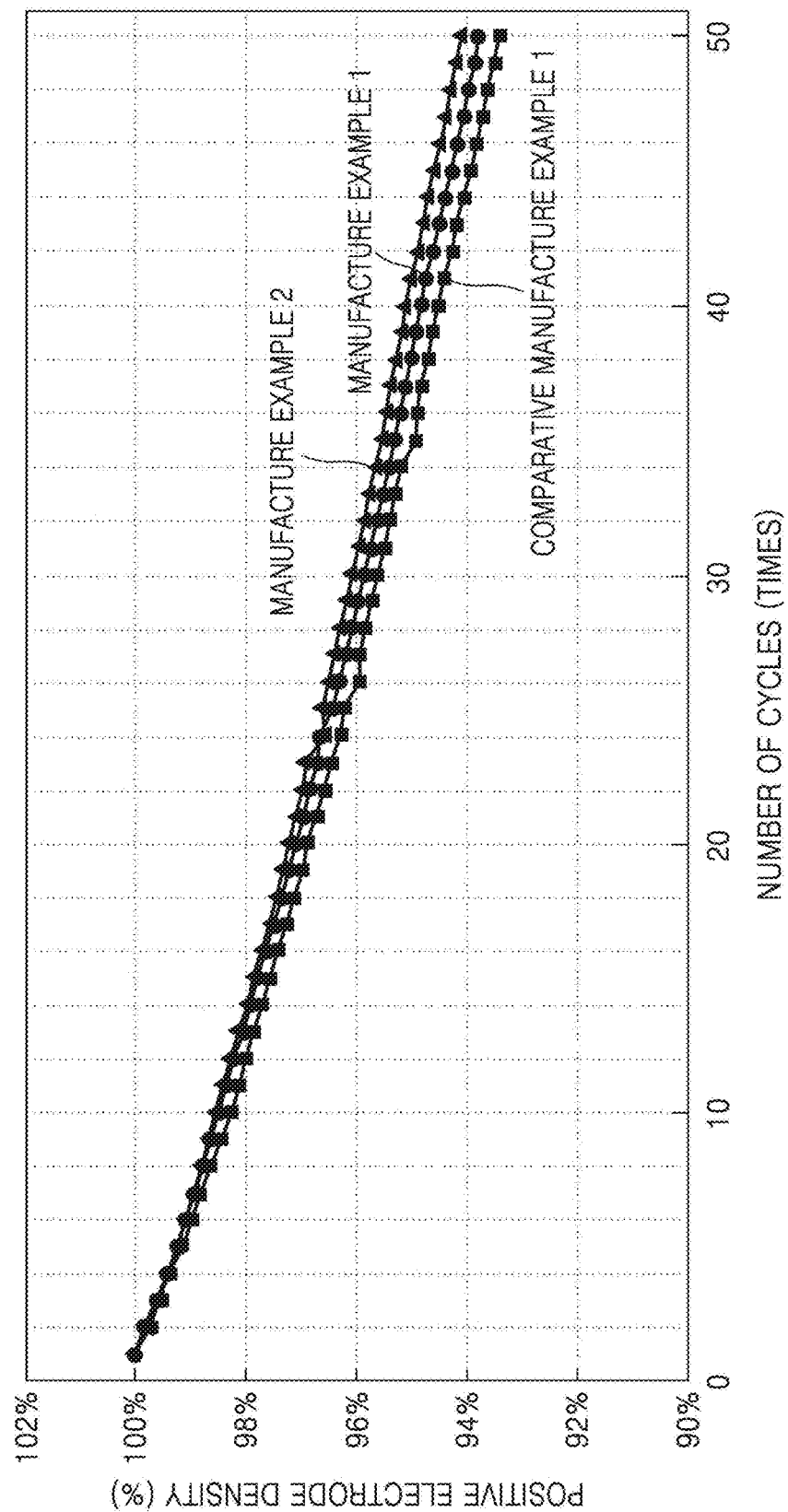
FIG. 6 is a graph illustrating changes in capacity retention in lithium secondary batteries manufactured in Manufacture Examples 1 and 2 and Comparative Manufacture Example 1.

An initial charge efficiency (I.C.E.) was calculated using Equation 1. The results are shown Table 5. A capacity retention was calculated using Equation 2. The results are shown in FIG. 6.

Initial charge efficiency (I.C.E.)[%]=[Discharge capacity at $1^{st}$ cycle/Charge capacity at $1^{st}$ cycle]×100  [Equation 1]

Capacity retention (%)=(Discharge capacity at $50^{th}$ cycle/Discharge capacity at $1^{st}$ cycle)×100  [Equation 2]

TABLE 5

| Example | Charge capacity (mAh/g) | Discharge capacity (mAh/g) | I.C.E (%) |
|---|---|---|---|
| Manufacture Example 1 | 223 | 219 | 98 |
| Manufacture Example 2 | 223 | 218 | 98 |
| Comparative Manufacture Example 1 | 220 | 216 | 98 |

Referring to Table 5, the coin cells manufactured in Manufacture Examples 1 and 2 were found to exhibit initial efficiency characteristics equivalent to those of the coin cell of Comparative Manufacture Example 1. Referring to FIG. 6, the coin cells manufactured in Manufacture Examples 1 and 2 were each found to have an improved capacity retention, as compared with that of the coin cell of Comparative Manufacture Example 1. The coin cell of Manufacture Example 2 was found to have further improved lifetime characteristics, as compared with those of the coin cell of Manufacture Example 1.

Evaluation Example 6: High-Rate Discharge Characteristics

The coin cell manufactured in Manufacture Example 2 was charged with a constant current of 0.1 C and then with a constant voltage of 1.0 V (0.01 C cut-off), followed by a rest for about 10 minutes and then discharging with a constant current (0.1 C, 0.2 C, 1 C, or 2 C) until a voltage of 2.5 V was reached. Characteristics of the con cell were evaluated while changing the discharge rate to 0.1 C, 0.2 C, 1 C, or 2 C.

High-rate characteristics of the coin cell manufactured in Manufacture Example 2 are shown in Table 6. The high-rate discharge characteristics in Table 6 were calculated using Equation 3.

High-rate discharge characteristic (1 C/0.1 C)(%)= (Discharge capacity of cell when discharged at 1 C)/(Discharge capacity of cell discharged at 0.1 C)*100

High-rate discharge characteristic (2 C/0.2 C)(%)= (Discharge capacity of cell discharged at 2 C)/ (Discharge capacity of cell discharged at 0.2 C)*100  [Equation 3]

TABLE 6

| Example | High-rate discharge characteristic (1 C/0.1 C) (%) | High-rate discharge characteristic (2 C/0.2 C) (%) |
|---|---|---|
| Manufacture Example 2 | 89 | 85 |

Referring to Table 6, the coin cell manufactured in Manufacture Example 2 was found to have good high-rate discharge characteristics.

The invention claimed is:

1. A cobalt oxide ($Co_3O_4$) for a lithium secondary battery, the cobalt oxide having an average particle diameter (D50) of about 18 μm to about 19 μm and a tap density of about 2.1 g/cc to about 2.9 g/cc,
    wherein a peak of an additional CoO phase appears at a diffraction angle 2θ of about 41° to about 44° in an X-ray diffraction spectrum of the cobalt oxide.

2. The cobalt oxide of claim 1, wherein an amount of the additional CoO phase is from about 0.5 mole % to about 2 mole % based on a total amount 100 mol % of the cobalt oxide.

3. A method of preparing a cobalt oxide for a lithium secondary battery, the method comprising:
    reacting a mixture comprising a cobalt precursor, a precipitant, and a solvent at a temperature of about 40° C. to about 60° C. to obtain a cobalt carbonate; and
    thermally treating the cobalt carbonate under an oxidizing gas atmosphere to obtain the cobalt oxide according to claim 1.

4. The method of claim 3, wherein the thermal treatment is performed at a temperature of about 800° C. to about 1,000° C.

5. The method of claim 3, wherein the precipitant is at least one selected from ammonium bicarbonate ($NH_4HCO_3$), sodium carbonate ($Na_2CO_3$), and sodium bicarbonate ($NaHCO_3$).

6. The method of claim 3, wherein, in the reacting of the mixture, the mixture has a pH of about 7 to about 8.

\* \* \* \* \*